United States Patent
Pasquali et al.

[11] Patent Number: 5,725,949
[45] Date of Patent: Mar. 10, 1998

[54] HOLLOW-FIBER BUNDLE AND MASS-TRANSFER AND/OR HEAT EXCHANGER

[75] Inventors: Renato Pasquali, Wuppertal; Uwe Stein, Heinsberg-Schafhausen, both of Germany

[73] Assignee: Akzo Nobel nv, Arnhem, Netherlands

[21] Appl. No.: 568,164

[22] Filed: Dec. 6, 1995

[30] Foreign Application Priority Data

Mar. 11, 1995 [DE] Germany ............ 195 08 895.6
Oct. 20, 1995 [DE] Germany ............ 195 39 192.6

[51] Int. Cl.[6] .................................................. D02G 3/00
[52] U.S. Cl. .................. 428/364; 428/300; 428/373; 428/394; 428/358; 57/210; 57/243; 57/244; 57/247; 57/908
[58] Field of Search ............... 210/321 R, 433, 210/490; 428/394, 300, 364, 373, 358, 360, 374, 376, 377, 401; 57/210, 243, 244, 908, 247

[56] References Cited

U.S. PATENT DOCUMENTS 4,066,553   1/1978   Bardonnet et al. ............ 210/321
4,428,403   1/1984   Lee ................................ 138/130
5,450,516   9/1995   Pasquali et al. ............... 385/115

FOREIGN PATENT DOCUMENTS 0 464 737 A1   1/1992   European Pat. Off. ........ B01D 63/02
0464731A1     8/1992   European Pat. Off. .
2 287 934      5/1976   France ........................... B01D 13/00
WO 93/19839   3/1993   WIPO ............................ B01D 63/02

OTHER PUBLICATIONS

European Search Report dated May 29, 1996.

*Primary Examiner*—Merrick Dixon
*Attorney, Agent, or Firm*—Joseph M. Noto; Louis A. Morris

[57] ABSTRACT

A hollow-fiber bundle containing at least one core bundle, where the core bundle contains at least three hollow fibers which are arranged around a carrier thread, with at least one winding thread wound around them, where the cross-sectional form of the carrier thread varies along the length of the core bundle is disclosed.

15 Claims, 1 Drawing Sheet

HOLLOW-FIBER BUNDLE AND MASS-TRANSFER AND/OR HEAT EXCHANGER

CROSS-REFERENCE TO RELATED APPLICATIONS

This application claims the benefit of the filing dates of prior German Application Nos. 19508895.6 and 19539192.6 filed Mar. 11, 1995 and Oct. 20, 1995 respectively, which are incorporated herein by reference in their entirety.

BACKGROUND OF THE INVENTION

1. Field of the Invention

The present invention relates to hollow-fiber bundles as well as mass-transfer and/or heat exchangers which contain such hollow-fiber bundles.

2. Description of the Related Art

Such hollow-fiber bundles are widely known. They are employed in the manufacture of heat and/or mass-transfer exchangers, whereby the bundle is embedded at one or both ends in a tube sheet (if a single tube sheet is used, the free ends of the hollow fibers are normally closed up). By this means the interior cavity of the hollow fibers can be isolated from the space around the hollow fibers and can thus be charged with various fluids, which in the case of heat exchangers have differing temperatures or in the case of mass-transfer exchangers have differing consistencies. What is essential for the effectiveness of such hollow-fiber bundles is firstly that they are embedded fluid-tight in the tube sheet, and secondly that fluid can flow around the hollow fibers easily and uniformly. To this end it is necessary for the hollow fibers to be separated from each other in order to obtain as large an effective surface area as possible. According to U.S. Pat. No. 4,293,418, for example, this is achieved by winding at least one winding thread helically around each single hollow fiber or pair of hollow fibers. The winding threads act as separators between adjacent hollow fibers, whereby the thickness of the winding threads dictates the cross-section of flow between adjacent hollow fibers. If two hollow fibers are wound together, there is linear contact between these two hollow fibers, so that no fluid can pass between them. Moreover, it is evident that this approach to manufacturing core bundles is very complicated and, especially when sensitive hollow fibers are involved, runs the risk of damaging individual hollow fibers.

SUMMARY OF THE INVENTION

In accordance with one aspect of the present invention there is provided an additional hollow-fiber bundle which does not have the disadvantages discussed above. In particular, the manufacture of the hollow-fiber bundle according to the present invention should be cost-effective.

It is also an aspect of the invention to provide a heat and/or mass-transfer exchanger which is inexpensive to manufacture and highly effective.

These and other aspects of the present invention will become apparent upon a review of the following detailed description and the claims appended thereto.

DETAILED DESCRIPTION OF PREFERRED EMBODIMENTS

Figure 1:
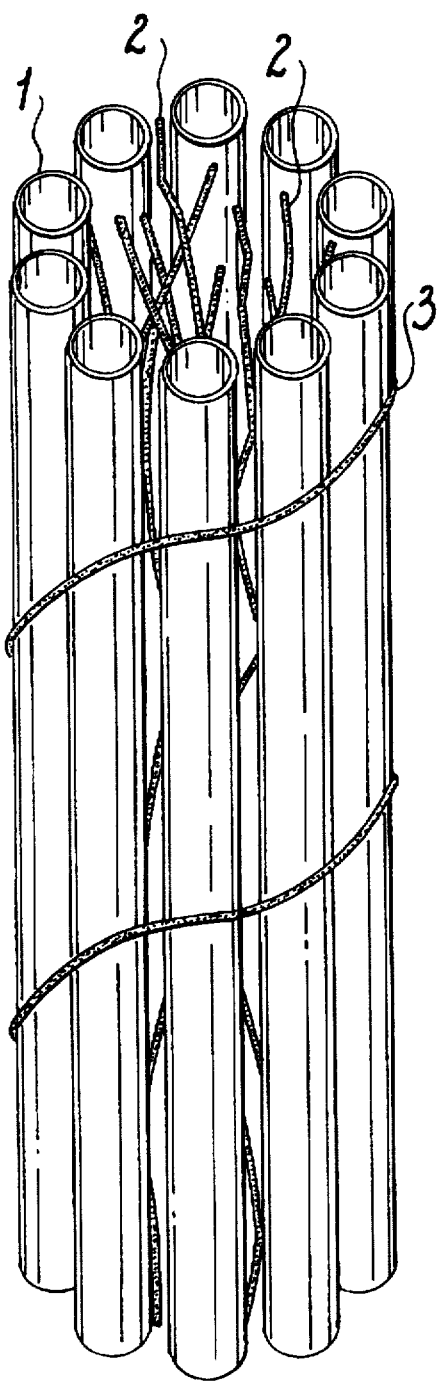
FIG. 1 is a perspective view of the hollow-fiber bundle of the present invention.

The present invention provides a hollow-fiber bundle which contains at least one core bundle, where the core bundle contains at least three hollow fibers which are arranged around a carrier thread, with at least one winding thread wound around them, where the cross-sectional form of the carrier thread varies along the length of the core bundle.

By means of the carrier thread, the hollow fibers are also held at a distance from each other, so that, by means of the interplay of the varying cross-sectional forms of the carrier thread along the length of the core bundle, a fluid can flow between the hollow fibers on the one hand and between the hollow fibers and the carrier thread on the other hand. The carrier thread can simply be a solid or hollow fiber whose diameter varies along its length. However, the carrier thread can also have an open-pored form such that the fluid can flow through its pores.

In a further embodiment, the hollow-fiber bundle according to the invention contains at least one partial bundle in which at least one additional layer of hollow fibers is arranged around the core bundle, where at least one winding thread is wound around each additional layer.

It is especially beneficial if the carrier thread and/or the winding thread is a multifilament thread. Since the filaments of a multifilament thread change their positions along its length, the cross-section of a multifilament thread also varies along its length. Normally, the filaments of multifilament threads are solid as opposed to hollow fibers. However, in special cases the filaments can also be implemented as hollow fibers and/or can be porous. If the carrier thread is formed from a multifilament thread, this will enable fluid to flow through readily on account of the very flexible single filaments of the multifilament thread. Forming the winding thread from a multifilament thread also ensures that the winding process will be gentle, especially where sensitive hollow fibers are involved.

It is especially advantageous if the carrier thread and/or the winding thread is a textured multifilament thread. A textured multifilament thread, which may be manufactured using any of the known texturing processes such as stuff-crimping or false twist, is distinguished particularly by the bulkiness which the thread is capable of developing. If such a textured multifilament thread is inserted between the hollow fibers during manufacture of the core bundle, and if one or more winding threads are wound around the bundle so formed, the filaments will then attempt to distribute themselves as well as possible between the hollow fibers, whereby single filaments as well attempt to position themselves at least in part between adjacent hollow fibers, thus also guaranteeing a certain minimum space between adjacent hollow fibers. By means of the filaments which distribute themselves to different extents along its length, a textured multifilament thread has a significantly varying cross-sectional form along its length.

In the manufacture of the core bundles it is especially beneficial if the core bundles can be manufactured immediately after the hollow fibers are manufactured, without intermediate spooling. The carrier threads are normally drawn off one or more bobbins and directed to the hollow fibers, drawn off the hollow-fiber machine or off bobbins, in such a way that the carrier threads are arranged in the middle of the hollow-fiber bundle. After that, one or more winding threads are wound around the core bundle thus formed. This can be done for example by arranging bobbins, on which the winding threads are wound, on a rotatable disc which is open in the middle. The core bundle, consisting of carrier thread and hollow fibers, is fed through the middle of this disc, and the winding thread is applied to this core bundle helically by turning the disc.

It is obvious that it is advantageous for the number of hollow fibers and the thickness of the carrier thread to be consistent with one another so that the hollow fibers largely cover the outside of the carrier thread, while still leaving at least a small amount of space between adjacent hollow fibers. For example, for a carrier thread made from polyester and consisting of a textured multifilament thread with a total titer of 167 dtex and a total of 30 filaments, an arrangement of up to 10 hollow fibers, each with an outer diameter of 240 mm, around such a carrier thread, has proven to be very satisfactory. For such a core bundle, a suitable winding thread comprises one or more textured multifilament threads, which may for example have 14 single filaments and a total titer of 33 dtex or, like the carrier thread, a total titer of 167 dtex and 30 filaments. In the manufacturing process described, the number of laps around the core bundle per unit length can be adjusted in a simple manner via the speed of the core bundles and the r.p.m. of the disc. If the speed of the hollow fibers is high in relation to the possible r.p.m. of the disc, this can be compensated for by winding a plurality of winding threads. Normally, more than ten hollow fibers are manufactured simultaneously in a hollow-fiber machine. In this case, a suitable number of rotatable discs provided with winding-thread bobbins are arranged, according to the number of hollow fibers leaving the hollow-fiber machine.

In the manufacture of the partial bundles, a plurality of hollow fibers or groups of hollow fibers are arranged around the core bundle, after which, again by means of winding-thread bobbins arranged on a rotatable disc, one or more winding threads are wound around the core bundle, around which the hollow fibers are arranged, being fed through the disc. After that, additional hollow fibers can be positioned around the now-formed bundle in a second layer, after which one or more winding threads are again wound around this bundle in turn. This process can be repeated several times, and it is practical to have a number of hollow fibers in each layer which will allow the hollow fibers to be arranged evenly around the bundle formed so far, with all hollow fibers lying side by side. To this end it has proven expedient to arrange only that number of hollow fibers in a layer allowing the hollow fibers in the layer to still be spaced at a distance to each other, for example, a distance equal to the diameter of the winding thread.

The hollow-fiber bundle consisting of core bundles and/or partial bundles is manufactured from the core bundles or the partial bundles in a well-known manner. For example, after being wound up, the core bundles and/or partial bundles can immediately be cut to length and laid on top of and adjacent to each other. However, it is better if the core bundles and/or partial bundles are wound on a drum and removed from the drum and cut to the desired length when the desired number of hollow fibers has been reached (gyro wheel process). However, the strands of core bundles and/or partial bundles can also be wound around a vertical storage apparatus with the help of a thread guide linkage mechanism (flyer process). Here, too, the hollow-fiber bundle formed from a plurality of core bundles and/or partial bundles is removed and cut to size.

In the hollow-fiber bundle according to the invention, it has proven especially beneficial if the titer of the carrier thread is between one and three times the titer of the winding thread. The effectiveness of the hollow-fiber bundle of the invention can be increased if the hollow fibers are undulating. The resulting increased bulkiness can be decreased in compensation by arranging the winding threads in the troughs of the undulation of the hollow fibers. If wound in a suitable manner, the winding thread can preserve the undulation when tension is applied during subsequent processing of the core bundle or partial bundle and the hollow-fiber bundle formed from them. Thus, the winding thread can also be used to ensure that the undulation of the core bundles or partial bundles is not diminished by tension, or at least not completely eliminated.

The hollow-fiber bundle according to the invention is distinguished particularly by the fact that the hollow fibers of the core bundle and/or the hollow-fiber layers of the partial bundles are wound helically using at least one winding thread. If a plurality of winding threads are employed, it can be beneficial to wind these in the same direction. For improved fixation of the hollow fibers in the core bundle or in partial bundles, however, it may also be advantageous if at least two winding threads are wound helically around the hollow fibers of the core bundle or of the partial bundles, where the helix of at least one winding thread is in the opposite direction to that of the other winding threads. Thus, if a plurality of winding threads are employed, one grade of winding thread can be arranged in the opposite direction to a second grade of winding thread. To manufacture core bundles wound in opposite directions, of course, two discs containing winding-thread bobbins and rotating in opposite directions are required.

It has proven especially advantageous for the winding-thread helix to have varying gradients along the length of the core bundle. This can be achieved in a simple manner in the manufacturing process described above by altering at regular or irregular intervals the r.p.m of the rotating discs holding the winding-thread bobbins, while the partial bundles consisting of carrier threads and hollow fibers are fed through the discs at constant speed.

The hollow-fiber bundle according to the invention has an especially beneficial filling ratio when the winding threads are arranged on the core bundles and/or on the partial bundles such that the distance between adjacent core bundles and/or partial bundles is equal to the diameter of the winding thread. This can be achieved in the manufacturing process described above by laying the winding thread fairly loosely onto the core bundle or partial bundle, so that when the core bundles or partial bundles are deposited during the subsequent manufacture of the hollow-fiber bundles, the winding threads can still easily be moved to a small extent. This ensures that when two core bundles or two partial bundles are laid one on top of the other, or when a core bundle is laid on top of a partial bundle or a partial bundle on top of a core bundle, the winding threads displace each other such that they come to lie adjacent to one another. In this case, the distance between adjacent core bundles and/or partial bundles is equal to the thickness of the winding thread.

For special applications of the hollow-fiber bundle according to the invention, it is beneficial if the core bundles have an undulating form. This can be effected by a pronounced traverse motion when depositing the core bundles or by previously undulating the hollow fibers.

A hollow-fiber bundle in which the core bundles and/or the partial bundles in the hollow-fiber bundle are arranged in a plurality of layers parallel to the direction of the hollow fibers, where a plan view of the layers shows that the core bundles and/or the partial bundles of one layer cross with the core bundles and/or the partial bundles of adjacent layers, has proven very good in most applications. This arrangement can be achieved in a particularly simple manner by using a traverse motion when depositing the core bundles and/or partial bundles onto the aforementioned drum or storage apparatus.

Preferred hollow-fiber bundles are characterized in that the carrier thread of a core bundle has a total titer of 100 to 1000 dtex, around which 6 to 40 hollow fibers with an outer diameter of 100 to 600 mm are arranged. For the winding thread, a total titer of 5 to 350 dtex has proven highly satisfactory for a core bundle as well as a partial bundle.

As discussed previously, the hollow-fiber bundle can consist solely of core bundles. However, it can also contain additional single hollow fibers, whereby these single hollow fibers should preferably be arranged such that they are distributed evenly between the core bundles. Moreover, the hollow-fiber bundle according to the invention can also contain core bundles and partial bundles. Here, too, it may be practical in certain cases to arrange additional single hollow fibers between the core bundles and partial bundles. In certain cases it may also be practical to wind together a plurality of core bundles and/or partial bundles once more and to assemble a plurality of the structures thus wound together to form a hollow-fiber bundle. However, the hollow-fiber bundle according to the invention can also consist solely of partial bundles or have additional single hollow fibers between these partial bundles, whereby here again a plurality of partial bundles can be wound together with an additional winding thread. The hollow-fiber bundle according to the invention may also consist of a single partial bundle, however, where practically any desired number of hollow fibers can be united to form a hollow-fiber bundle by selecting the number of layers, which are each separated by one or more winding threads wound in the same or opposite directions.

Where partial bundles are employed, especially partial bundles which have a plurality of layers separated by winding threads, it has been shown that it is possible to omit the nevertheless advantageous carrier thread from the core bundle without diminishing the effectiveness of the finished hollow-fiber bundle for the application it is designed for.

The objective of the invention is also achieved by a mass-transfer and/or heat exchanger containing at least one hollow-fiber bundle according to the invention, whereby at least one end of the hollow-fiber bundle is embedded in a (respective) tube sheet such that all hollow fiber ends of the respective end of the hollow-fiber bundle are enclosed by tube sheet material in a fluid-tight manner.

If only one end of the hollow-fiber bundle is embedded in a tube sheet, the other, free ends of the hollow fibers are usually closed off in a liquid-tight manner (dead end). Normally, however, both ends of the hollow-fiber bundle are embedded in a respective tube sheet such that all hollow fiber ends of the respective end of the hollow-fiber bundle are enclosed by the material of the respective tube sheet so as to be liquid- and/or gas-tight. Here, the inner cavities of the hollow fibers are visible, i.e. not closed off, from the outside of at least one tube sheet. Mass-transfer and/or heat exchangers of this kind are characterized by their particularly high efficiency.

Depending on the hollow fibers used, the mass-transfer exchangers according to the invention can be employed for dialysis, hemodialysis, hemofiltration, hemoperfusion, oxygenation of blood, gas separation, microfiltration, or nano- and/or ultrafiltration. The hollow-fiber bundles of the invention can also be used in affinity modules. For this purpose, a ligand is deposited in the pores of the hollow fibers.

The hollow fibers suitable for the hollow-fiber bundles according to the invention can have any geometrical form imaginable. Normally, both the inner cross-section and the outer cross-section of these hollow fibers have a circular or near-circular form. The inner and/or outer cross-sections can, however, also have other geometrical forms such as elliptical, triangular, square, rectangular or polygonal forms. The material of the hollow fibers, too, can vary among a wide choice. These materials are sufficiently well-known and therefore not discussed further here. As in the case of the carrier and winding threads, material selection is not the main criterion. What is essential is that materials for hollow fibers, carrier threads and winding threads are selected to suit the respective application. In many cases these materials must be non-toxic. Hollow fibers made from cellulose as well as hollow fibers made from poly(ethersulfone)s, polypropylenes, polyethylenes, polyamides, polyacrylonitriles, polyacrylates, polyimides, polyamideimides, polycarbonates, or polyether esters, or copolymers and/or mixtures of these polymers, have proven to be very satisfactory. As materials for the carrier and/or winding threads, polyesters, polypropylenes, polyacrylates, polyacrylonitriles, polyamides and cellulose materials have proven quite suitable.

FIG. 1 shows in a schematic form a core bundle from which the hollow-fiber bundle according to the invention is assembled. The hollow fibers i are arranged around a textured multifilament yarn consisting of single filaments 2. A winding thread 3 is wound helically around these hollow fibers. The hollow-fiber bundle according to the invention is normally made up only of core bundles, but it may also contain additional single hollow fibers arranged in the space formed between adjacent core bundles.

Figure 2:
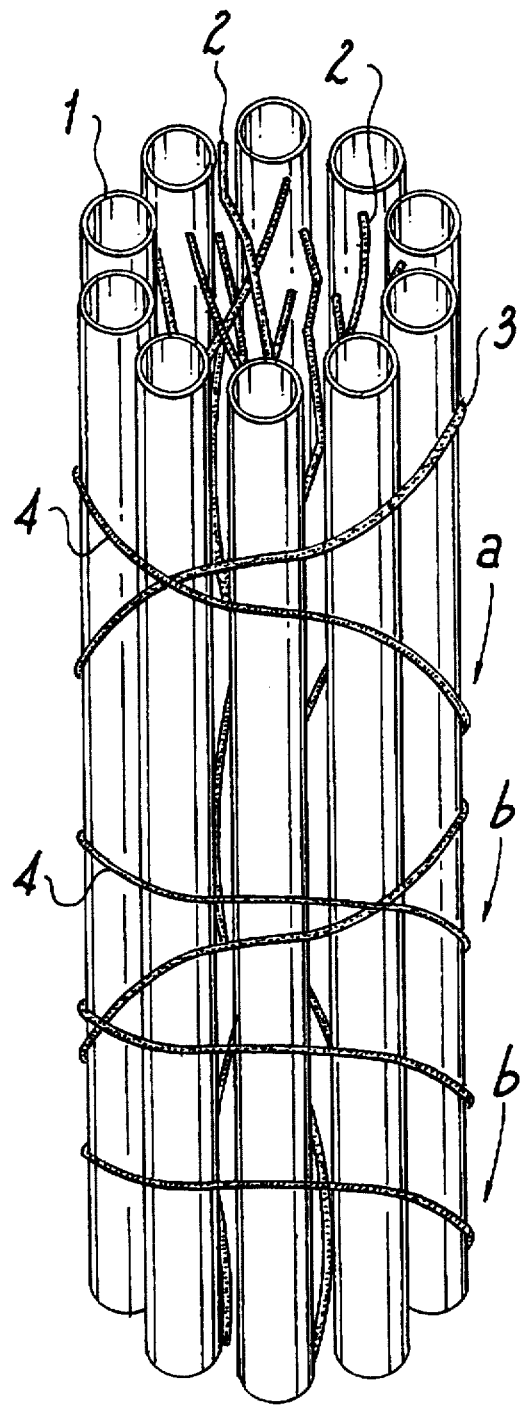
FIG. 2 is a perspective view of the hollow-fiber bundle wrapped by a winding thread.

FIG. 2, again in a schematic form, shows a core bundle in which in addition to the core bundle represented in FIG. 1 an additional winding thread 4 is represented, whose helix is in the opposite direction to that of winding thread 3. Winding thread 4 also exhibits different gradients along the length of the core bundle, indicated in the figure by a and b. As discussed above, one or more winding threads with varying gradients can be arranged on the core bundle, possibly, as shown here, in conjunction with winding threads whose helix runs in the opposite direction. Winding threads arranged in opposite directions may also be provided with a constant helix or pitch.

While the invention has been described with preferred embodiments, it is to be understood that variations and modifications are to be considered within the purview and the scope of the claims appended hereto.

What is claimed is:

1. A hollow fiber bundle comprising at least one core bundle, which core bundle comprises a carrier thread, at least three hollow fibers and at least one winding thread, in which said core bundle:

said carrier thread has a cross-sectional form which varies along its length, said hollow fibers are arranged around said carrier thread, and said at least one winding thread is wound around said hollow fibers of said core bundle.

2. The hollow fiber bundle of claim 1, wherein at least one of said carrier thread and said winding thread is a multifilament thread.

3. The hollow fiber bundle of claim 1, wherein at least one of the carrier thread and the winding thread is a textured multifilament thread.

4. The hollow fiber bundle of claim 1, wherein the denier of the carrier thread is between one and three times the denier of the winding thread.

5. The hollow fiber bundle of claim 1, wherein said hollow fibers undulate with a trough formed by each undulation.

6. The follow fiber bundle of claim 5, wherein said winding threads are arranged in said troughs of the undulation of said hollow fibers.

7. The hollow fiber bundle of claim 1, wherein at least one winding thread is wound helically around said hollow fibers of said core bundle.

8. The hollow fiber bundle of claim 1, wherein at least two winding threads are wound helically around said hollow fibers of said core bundle, with the helix of one winding thread in the opposite direction to that of another winding thread.

9. The hollow fiber bundle of claim 7, wherein at least one of said winding thread helices has a gradient which varies along the length of said core bundle.

10. The hollow fiber bundle of claim 1, wherein said core bundle undulates.

11. The hollow fiber bundle of claim 1, wherein said carrier thread of said core bundle has a denier of 100 to 1,000 dtex, around which a carrier thread of from 6 to 40 hollow fibers with an outer diameter of 100 to 600 mm are arranged.

12. The hollow fiber bundle of claim 1, wherein said winding thread has a denier of 5 to 350 dtex.

13. The hollow fiber bundle of claim 1, wherein said winding threads are arranged on said core bundles such that the spacing between at least one of the adjacent core bundles is equal to the diameter of said winding thread.

14. The hollow fiber bundle of claim 1, wherein at least one of said core bundles are arranged in said hollow fiber bundle in a plurality of layers parallel to the direction of said hollow fibers, where a plan view of the layers shows that at least one of said core bundles of one layer cross with the core bundles of adjacent layers.

15. The hollow fiber bundle of claim 1, composed solely of core bundles.

* * * * *